United States Patent Office 3,317,806
Patented May 2, 1967

3,317,806
SPEED REGULATOR OF AN ELECTRIC MOTOR
Rene Farinelli, Geneva, Louis Maret, Prilly, and Pierre Riondel, Geneva, Switzerland, assignors to Societe Anonyme des Ateliers de Secheron, Geneva, Switzerland
Continuation of application Ser. No. 462,995, June 10, 1965. This application Aug. 4, 1966, Ser. No. 570,378
4 Claims. (Cl. 318—305)

This application is a continuation of application Number 462,995 filed June 10, 1965, and now abandoned which was a continuation-in-part of application Number 186,556 filed April 10, 1962, and now abandoned.

The object of the present invention is a speed regulator for an electric motor, particularly of the traction type, which comprises a speed range detector acting, on the one hand, at the inlet point of a regulating chain and, on the other hand, at the inlet point of an anticipation chain which is parallel to a portion of the regulating chain and which contains a differentiator.

It is difficult to balance the automatic regulation of the speed of an electric motor when the motor drives a very heavy load. The difficulties are increased in the case of a traction motor of a locomotive which, for the feed of the motor, contains a voltage changer having a time response that is relatively long.

For example, in a device which compares the desired speed $v_0$ (speed displayed by the engine-driver) with the instantaneous actual speed $v$ and which acts on the voltage $U_m$ of the motors in the following manner:

$$dU_m = k(v_0-v)dt$$

where $k$ is a constant, the voltage $U_m$ will increase if $v<v_0$, and will decrease when $v>v_0$ until $v=v_0$. In the case of a locomotive motor the inertia of the train and the lag of the voltage changer can greatly exceed the selected value $v_0$ thus giving rise to a cyclic variation in the voltage changer. In order to avoid exceeding the desired speed, the increase or the decrease of the voltage $U_m$ must be slowed down before $v$ reaches $v_0$, which is possible if one takes into account the acceleration $dv/dt$. The above formula must then be completed as follows:

$$U_m = k\int(v-v_0)dt - f(dv/dt)$$

Experience shows that this device is satisfactory provided that it is sensitive to accelerations of the order of 0.01 m./s.$^2$.

It is possible to obtain a value proportional to the function $dv/dt$ with an electric element, as for example with a condenser. A voltage proportional to the speed is applied and the current which is proportional to $dv/dt$ passing therethrough is measured.

Assuming that the speed of the locomotive may vary between 0 and 120 km./h., that the acceleration has a constant value of 0.01 m./s.$^2$, that a condenser of 1000 µf. is employed and that the continuous voltage corresponds to the maximum speed of 10 v, then the time necessary to charge the condenser will be:

$$T = \frac{v}{\frac{dv}{dt}} = \frac{120 \text{ km./h.}}{0.01 \text{ m./s.}^2} = 3333s$$

The current will be:

$$i = \frac{Q}{T} = \frac{CU}{T} = \frac{0.001 \cdot 10}{3333} = 3 \cdot 10^{-6} A$$

This current is of the order of the quantity of the leakage current of the condenser and it would be very difficult to make an accurate regulation under these conditions.

In the present invention a value proportional to $dv/dt$ is brought in only near the desired speed, so that a relatively wide action on the differentiator can be obtained.

To this end, the speed regulator according to the present invention has an anticipation chain which includes, between its inlet point and the said differentiator, a non-linear element which comprises a gradient and a saturation zone, this latter element being fed by an electric quantity which is proportional to the difference between the desired speed and the instantaneous actual speed.

The accompanying drawing shows, diagrammatically, one embodiment of the regulator which is the object of the invention.

Figure 1:
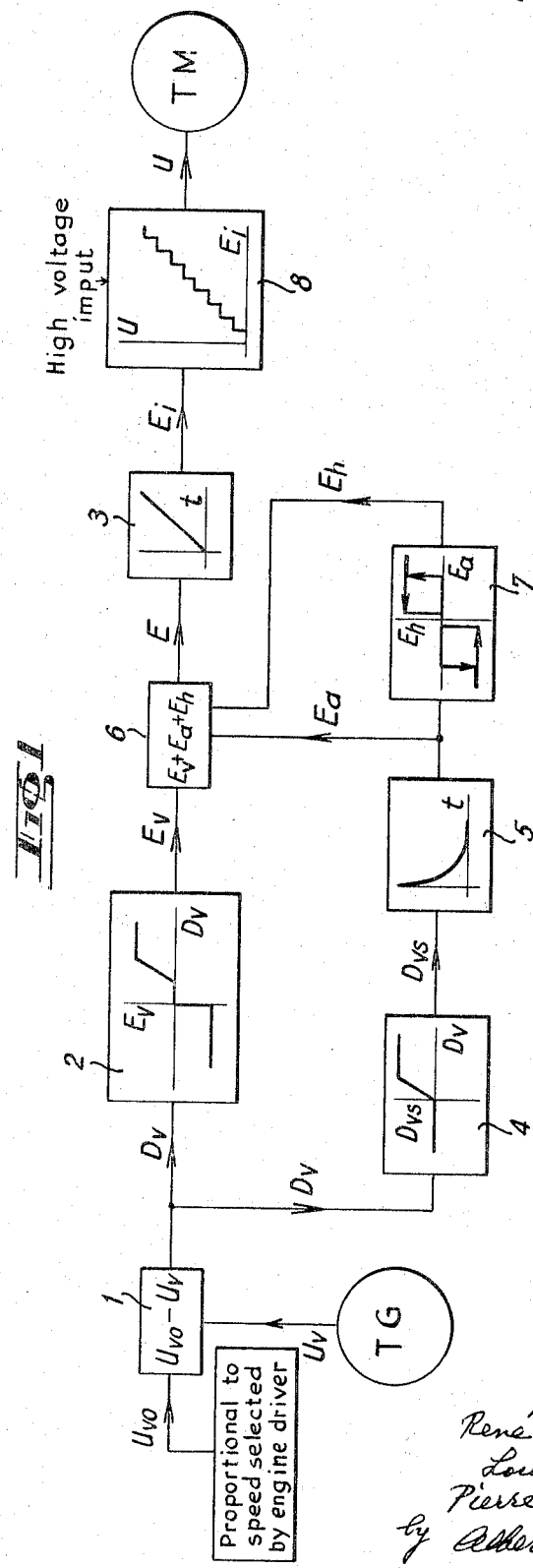
FIGURE 1 shows a block diagram of all elements of this embodiment, with their respective connections.

This embodiment shown in FIG. 1 is a regulator for a locomotive motor. Consequently, in describing this embodiment and its working, the term "speed" refers to the speed of the train and not to the speed of rotation of the traction motor. The speed of the train being practically proportional to the number of revolutions per unit of time of the motor, the following considerations may refer to one or the other of these speeds.

The regulator shown comprises a differential amplifier 1 which serves as a speed range detector. A continuous voltage $U_v$ produced by a tachometric generator TG and representing the instantaneous actual speed of the train, and a voltage $U_{v0}$ proportional to the speed speed selected by the engine-driver are fed in at the inlet portion of said amplifier. The voltage $D_v$, produced at the outlet portion of this amplifier 1, is strictly proportional to $v_0-v$. The outlet portion of the amplifier 1 is connected to an inlet point of a regulating chain, composed of an apparatus 2 and an integrator 3, as well as to the inlet point of an anticipation chain which is composed of a non-linear element 4, a differentiator 5 and a non-linear element 7 having two hysteresis loops. 8 shows, diagrammatically, a voltage changer wherein the temporary position depends on the quantity produced at the outlet portion of the regulating chain. It will be seen that the anticipation chain is connected in parallel with a portion of the regulating chain, and this by means of an amplifier 6 working as a summator.

Apparatus 2 must be such that the outlet current $E_v$ is constant and negative for a negative value of the voltage $D_v$, whereas for a positive value of $D_v$, the current $E_v$ is first of all zero, then variable and positive according to a relatively steep gradient, and finally constant. This is achieved through utilizing a Schmitt trigger (for the negative jump), a Zener diode in series (for the insensitiveness zone) and a Zener diode in parallel (for the gradient and the saturation zone).

Figure 3:
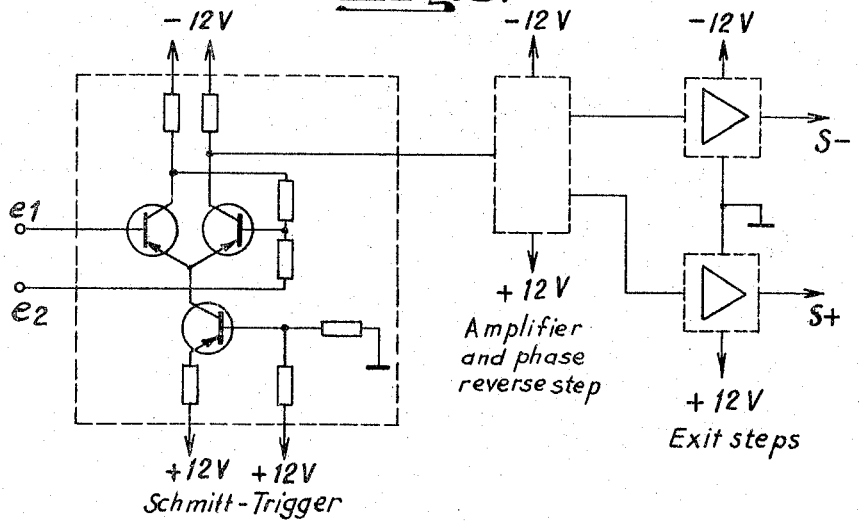
FIGURE 3 shows a Schmitt trigger which can be used in elements 2 and 7 of FIG. 1.

FIG. 3 shows schematically how the Schmitt trigger unit for element 2 can be built up. This unit comprises a Schmitt trigger, an amplifier and phase reverse step, and two exit steps. Such a unit or nonlinear element gives an impulse signal when the polarity of the signal between entries $e_1$ and $e_2$ changes. One of the exit steps gives a positive signal S+ and the other exit step gives a negative signal S−.

The entry $e_1/e_2$ has differential character, which means that the switch effect occurs at the moment when the potential difference between $e_1$ and $e_2$ changes its sign. However, entries $e_1$ and $e_2$ are not entirely symmetric, and it is recommended to use $e_1$ as signal entry and $e_2$ as entry for the reference potential. The latter is zero if $e_2$ is connected to the zero-point (mass, ground). In this case, a very weak potential put to entry $e_1$ is sufficient to start the switch operation.

The Schmitt trigger unit is combined in known manner with the Zener diodes.

It should be noted that units such as that illustrated in FIG. 3, and elements such as 2 of FIG. 1 are well known to the art.

The non-linear element 4 produces, at the terminals of a load resistance, a voltage $D_{vs}$ which, with a normal diode, produces a zero value when $D_v$ has a negative value and which, with the use of a Zener diode in parallel, produces a positive and substantially constant value when $D_v$ has a positive minimum value (saturation point). If the voltage $D_v$ is between zero and this saturation point $D_{vs}$ is determined by the gradient characteristic. The saturation point corresponds to less than 20% of the maximum value of $D_v$ and, consequently, to a speed range of less than 20% of the maximum value. Preferably, the steepness of the gradient is such that this point corresponds to about 5% or less of the maximum of $D_v$.

Figure 2:
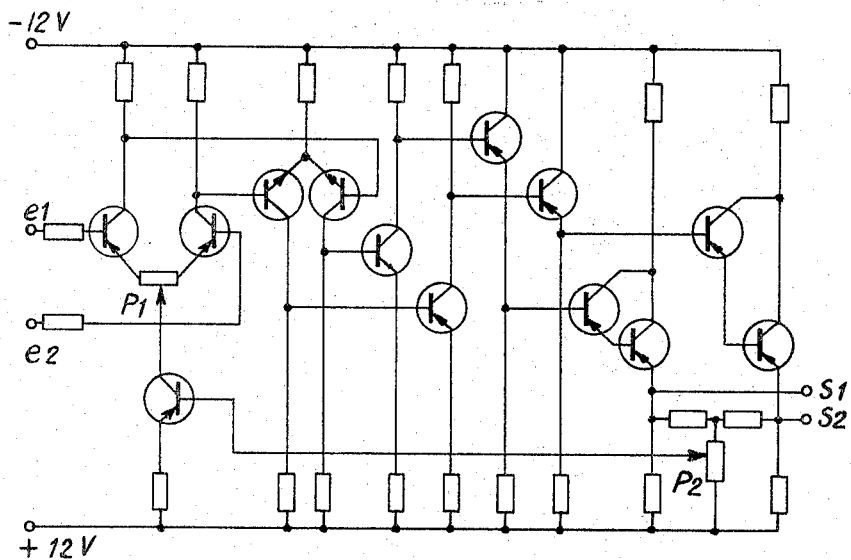
FIGURE 2 shows an amplifier which can be used in elements 3, 4, 5, and 6 of FIG. 1.

FIG. 2 shows schematically how an amplifier usable in element 4 can be built up. The unit shown in FIG. 2 is an operational amplifier with three voltage amplification steps, the first two steps being differential ones. After said three steps, there are provided push-pull power steps for lowering the exit impedance to the desired level.

This amplifier is attached asymmetrically between one entry ($e_1$ or $e_2$) and the zero point. The other entry is coupled to the zero point by means of an external equilibrium resistance. The exit signals $S_1$ and $S_2$ are symmetrical and in phase opposition. Moreover, $S_1$ is in phase opposition with $E_1$, and $S_2$ is in phase opposition with $e_2$.

Figure 5:
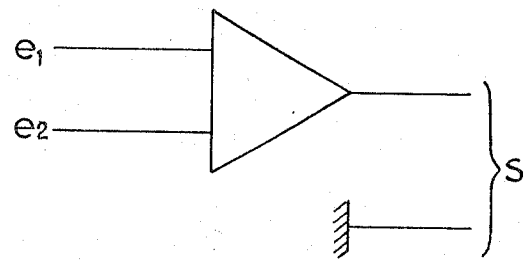
FIGURE 5 shows the amplifier of FIG. 2 switched as non-linear element.

Such an amplifier, which is known per se, can be used in known manner for proportional response (P), proportional-differential response (PD), proportional-integral response (PI) or proportional-integral-differential response (PID). Those skilled in the art will understand that the amplifier shown in FIG. 2 can be used according to FIGURE 5 as a non-linear element 4.

The differentiator 5 produces a current $E_a$ according to the equation $$E_a = k_1 \frac{d(D_{vs})}{dt}$$

Figure 6:
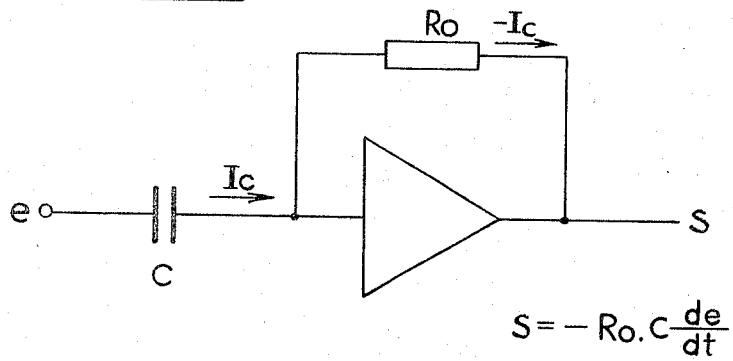
FIGURE 6 shows the amplifier of FIG. 2 switched as differentiator.

$k_1$ being a constant. This differentiator 5 contains an operational amplifier such as shown in FIG. 2, wired as shown in FIG. 6.

In non-linear element 7 an increasing positive value of $E_a$ produces an outlet voltage first of zero and then suddenly equal to a constant positive value when $E_a$ has a decreasing positive value, the constant positive outlet voltage is maintained for a longer time, only becoming zero when $E_a$ is very near to zero. When $E_a$ has a negative value a hysteresis loop which is below the abscissa results. This result may be obtained by utilizing two Schmitt trigger units as shown in FIG. 3 (one for the positive part and the other for the negative part) the outlet voltage of which reacts at the inlet point so as to create a hysteresis loop.

The summation amplifier 6 producing $E = E_v + E_a + E_h$ is provided with resistances in series at the inlet point and a counter-reaction resistance between the outlet portion and the inlet point. This principle is known in the art. An amplifier such as that shown in FIG. 2 may be used.

Figure 4:
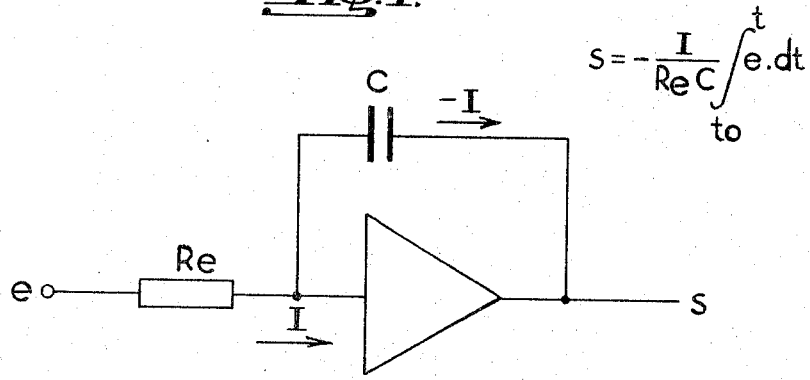
FIGURE 4 shows the amplifier of FIG. 2 switched as integrator.

Integrator 3 serves to form the integral of the electrical quantity E according to the formula $E_1 = k_2 \int E dt$. $k_2$ is a constant. This integrator 3 can consist of an operational amplifier, such as that shown in FIG. 2, wired according to FIG. 4.

The drawing shows that the changer 8 regulates the supply voltage U of the traction motor TM in such a way that it is practically proportional to the quantity $E_1$, except for the variation through small jumps which arises from the use of a step transformer. The latter is well known in the art, and comprises a motor which rotates a contact-drum or which actuates electro-pneumatic switches.

The regulator operates as follows:

Assuming that the engine-driver selects the maximum speed of 100 km./h. At the start, $v=0$ and $v_0=100$ km./h. The voltage $U_{v0}$ has its maximum value and the voltage $U_v$ is zero. $D_v$ will be strongly positive. Consequently $E_v$ and $D_{vs}$ reach their saturation values. The derivative $E_a$ being zero at this moment, it follows that $E = E_v$. The increase of the voltage U of the motor leads to an increase of the speed. Since the function $E_v = f(D_v)$ presents an area of insensitiveness for a low value of $D_v$, the quantity $E_v$ becomes zero when the actual speed $v$ approaches the desired speed $v_0$. This may be the case, in our example, when speed $v$ equals 97 km./h. Between this speed $v$ (97 km./h.) and when speed $v_0$ equals 100 km./h., it is the anticipation chain which intervenes. The gradient characteristic of the non-linear element 4 produces a very pronounced variation of $D_{vs}$ for a relatively small change of $D_v$. Since the current $E_a$ produced by the differentiator 5 is negative, the quantity $E_h$ obtained at the outlet of the element 7 becomes negative. Since $E_v$ is zero, E will be $E_a + E_h$. The strongly negative value of $E_h$ is maintained until the driving torque is practically equal to the resistant torque. During this stage of the regulation, $E_1$ and U decrease very rapidly. From the moment when $E_h$ becomes zero, the decrease of U continues more slowly, until $E_a$ is zero, which is the case when U reaches the point where the value of the driving torque is equal to the resistant torque; at that moment, the acceleration torque is zero and the speed can no longer change. The regulation is then balanced.

If the resistant couple varies (owing to the profile of the track) the balance is upset and an accelerating or decelerating torque appears; it will create a change of speed which, due to the sensitiveness of the anticipation chain, acts immediately on U to reestablish the balance between the driving torque and the resistant torque.

When the desired speed is temporarily exceeded, $D_v$ becomes negative while $E_v$ adopts a constant value, also negative, so that U and the speed $v$ decrease very rapidly.

If the engine-driver displays a smaller speed than the instantaneous actual speed, $D_v$ and $E_v$ become negative, while $E_a$ is zero. Voltage U decreases rapidly. When the speed corresponds to the desired speed, $D_v$ and $E_v$ are zero. As soon as the desired speed is reached, $E_a$ appears as a positive quantity, which creates an increase in the voltage U. Thus, the balance of the torques is quickly re-established.

It should be appreciated that the foregoing embodiment of the present invention is not limitative but rather illustrative of the invention disclosed herein.

What is claimed is:
1. A speed regulator for an electric motor comprising:
    (a) a speed range detector;
    (b) a voltage changer branched between a high voltage power source and the motor;
    (c) a regulating chain including between its inlet and outlet in series:
        (1) an apparatus wherein the outlet current is constant and negative for a negative value of the voltage produced at the outlet of the speed range detector, and is zero, then variable and positive and finally constant for a positive value of said voltage;
        (2) a summator; and
        (3) an integrator;
    (d) an anticipation chain, including between its inlet and outlet in series a non-linear element and a differentiator, said speed range detector acting on the inlet of said regulating chain, the outlet of the latter controlling said voltage changer, and said anticipation chain being branched in parallel to a part of said regulating chain so that the inlet of the anticipation chain is connected to the outlet of said speed range detector and the outlet of the anticipation chain is connected to said summator.

2. A speed regulator for an electric motor comprising:
(a) a speed range detector;
(b) a voltage changer branched between a high voltage power source and the motor;
(c) a regulating chain including between its inlet and outlet in series:
 (1) an apparatus wherein the outlet current is constant and negative for a negative value of the voltage produced at the outlet of the speed range detector, and is zero, then variable and positive and finally constant for a positive value of said voltage;
 (2) a summator; and
 (3) an integrator,
(d) an anticipation chain, including between its inlet and outlet in series a non-linear element and a differentiator, said speed range detector acting on the inlet of said regulating chain, the outlet of the latter controlling said voltage changer, and said anticipation chain being branched in parallel to a part of said regulating chain so that the inlet of the anticipation chain is connected to the outlet of said speed range detector and the outlet of the anticipation chain is connected to said summator, and comprising further
(e) a second non-linear element having at least one hysteresis loop, the inlet of which is connected to the outlet of the differentiator, and the outlet of which acts on said summator.

3. A speed regulator according to claim 2 wherein the first non-linear element has a saturation point which corresponds to a speed range of less than 20 percent of the maximum value.

4. A speed regulator according to claim 2 wherein the saturation point corresponds to a speed range of less than 5 percent of the maximum speed.

References Cited by the Examiner

UNITED STATES PATENTS

| | | | |
|---|---|---|---|
| 2,908,826 | 10/1959 | Oldenburger | 290—4 |
| 3,026,463 | 3/1962 | Wolke et al. | 313—327 |
| 3,046,464 | 7/1962 | Miller | 313—307 |
| 3,067,372 | 12/1962 | Blanchard et al. | 318—422 X |
| 3,187,092 | 6/1965 | Shashoua et al. | 178—6.6 |

ORIS L. RADER, *Primary Examiner.*

G. SIMMONS, *Assistant Examiner.*